(# United States Patent [19]

Riebock

[11] Patent Number: 4,829,672
[45] Date of Patent: May 16, 1989

[54] PROTECTIVE BOOT FOR TOOL MECHANISM

[75] Inventor: William Riebock, Rockford, Ill.

[73] Assignee: Greenlee Textron Inc., Rockford, Ill.

[21] Appl. No.: 105,117

[22] Filed: Oct. 6, 1987

[51] Int. Cl.⁴ .............................................. B26B 13/00
[52] U.S. Cl. ........................................ 30/123; 30/250
[58] Field of Search ............... 30/124, 134, 135, 143, 30/151, 175–193, 250–254, 123, 131; 81/181, 180.1; 269/271, 274; 74/566; 51/271

[56] References Cited

U.S. PATENT DOCUMENTS 2,985,957  5/1961  Freedman .............................. 30/124
4,178,682  12/1979  Sadauskas .......................... 30/192 X Primary Examiner—Frank T. Yost
Assistant Examiner—Michael D. Folkerts
Attorney, Agent, or Firm—R. A. Giangiorgi

[57] ABSTRACT

A protective boot is suited to protect from foreign matter the intermediate mechanism of a tool having jaws and handles which are operatively interconnected by the intermediate mechanism.

22 Claims, 4 Drawing Sheets

)

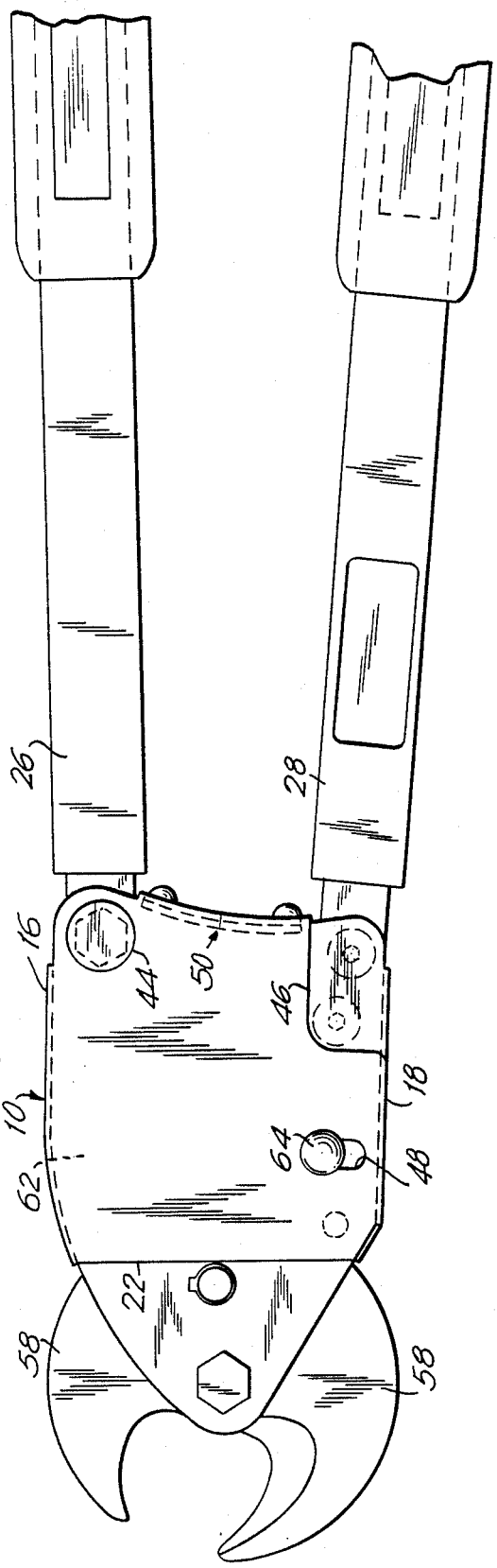
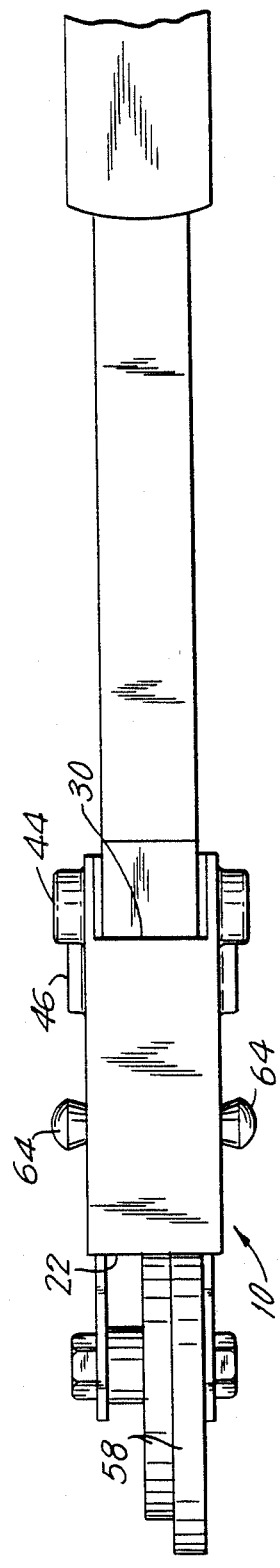
FIG. 1
FIG. 2

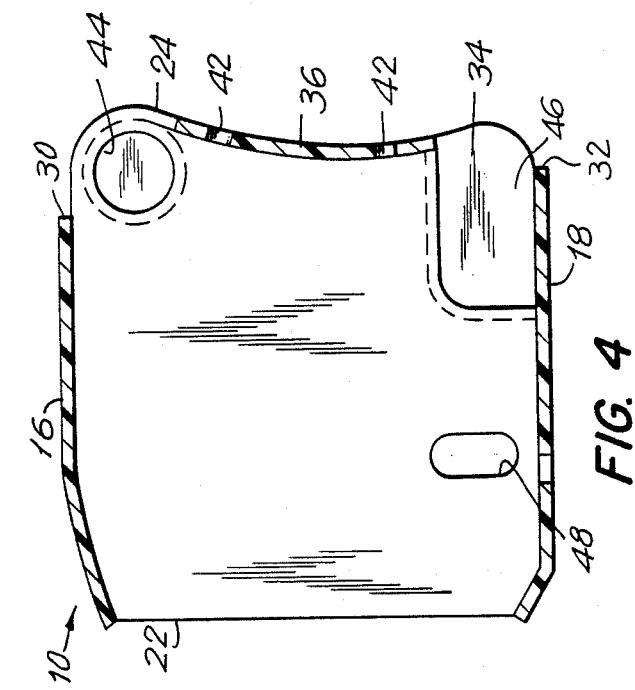
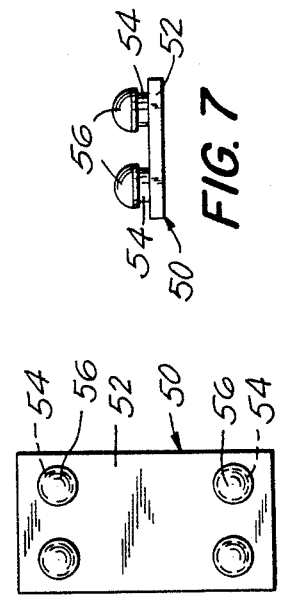
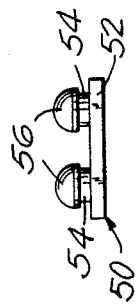
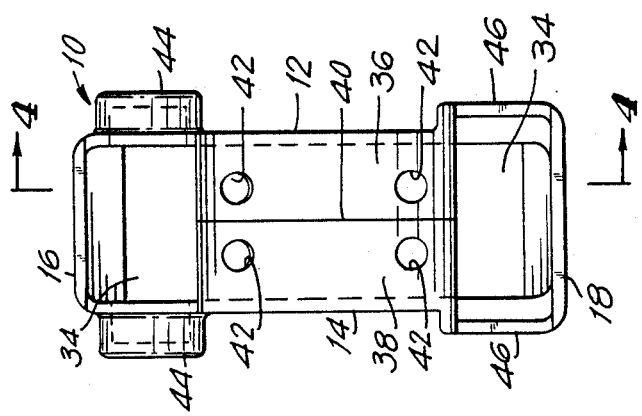
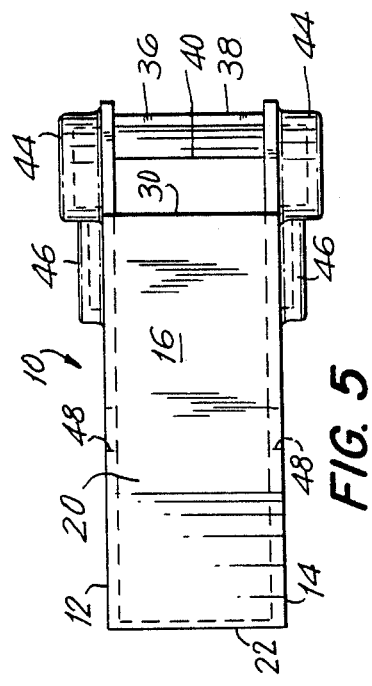

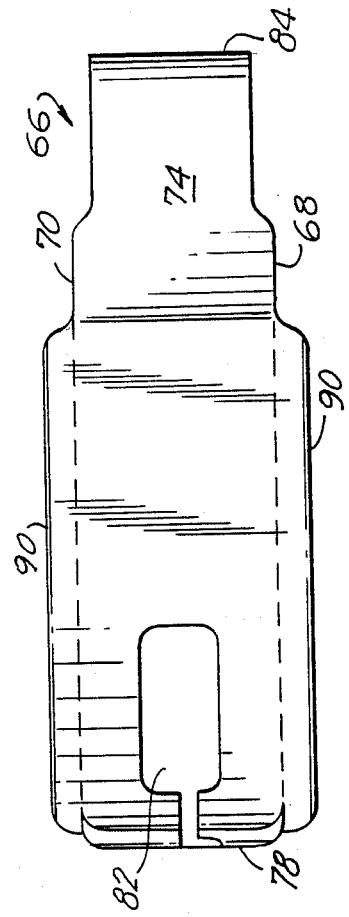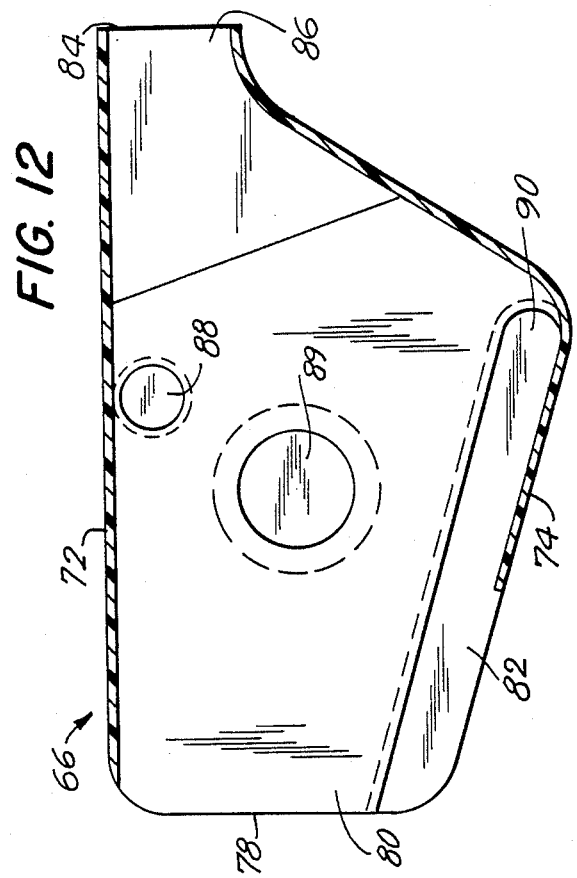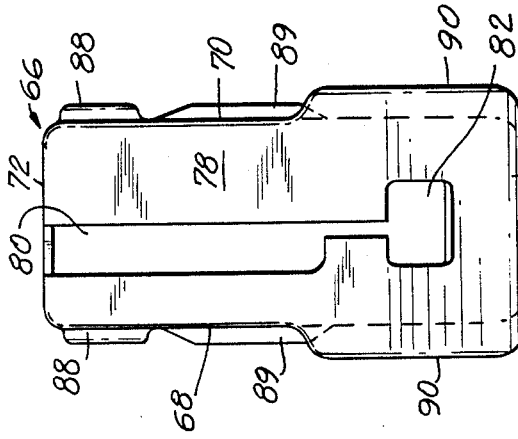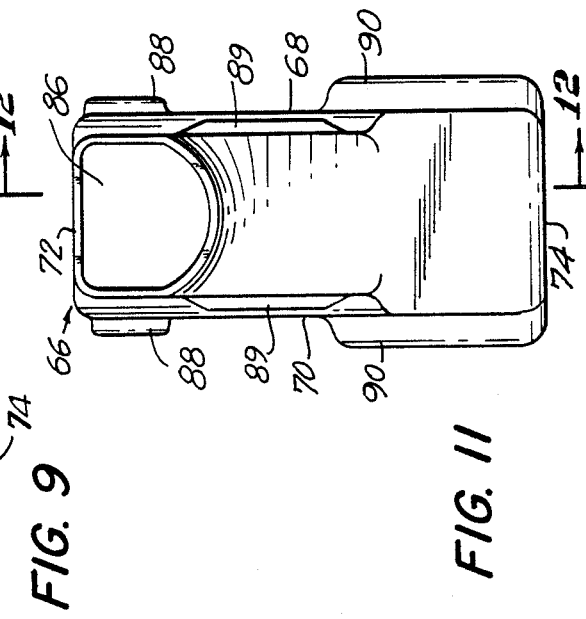

PROTECTIVE BOOT FOR TOOL MECHANISM

BACKGROUND OF THE INVENTION

This invention relates generally to a protective boot used to enclose at least part of the operating mechanism of a tool and more particularly to a boot to protect the mechanism which is generally positioned between a pair of handles manipulated by an operator and operative members, for example, cutting jaws, crimping jaws, holepunching jaws, etc. The boot may be applied to tools which are already well known and generally accepted in use, for example, ratchet-type cable cutters sold by Greenlee Tool of Rockford, Illinois, Model Nos. 754, 756, and 757. The intermediate mechanism generally located between the handles and the operative jaws serve varying purposes such as providing mechanical advantage for the forces applied at the handles or providing convenience for the operator in positioning the tool relative to a workpiece which may be located in inconvenient positions of limited access.

A major problem with such tools, in particular cutters, is dirt getting into the intermediate mechanism to jam, wear and break the mechanisms thereby making the tool inoperative or having a shortened useful life.

What is needed is a protective covering for the intermediate mechanism, which is not directly operated by the user of the tool or directly involved with the workpiece, which cover or boot prevents dirt and other extraneous materials from entering into the mechanism with potential for damaging the tool.

SUMMARY OF THE INVENTION

Generally speaking, in accordance with the invention, a flexible protective boot especially suitable for covering at least a portion of the intermediate mechanism of hand tools is provided. Moving elements of the intermediate mechanism are screened from foreign matter without impeding operation of the tool. The boot may be one piece molded to fit the contours of the particular tool to which it will be applied. The boot can be assembled to the tool without any disassembly of the tool and may be secured in position using an adhesive.

Accordingly, it is an object of this invention to provide an improved protective boot for a tool mechanism which is simple to apply to existing tools without disassembly thereof.

Another object of this invention is to provide an improved protective boot which covers the intermediate mechanism of a hand tool without interfering with tool operation.

A further object of this invention is to provide an improved protective boot for a tool mechanism which is simple in construction and inexpensive to produce.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a front elevation of a protective boot in accordance with the invention, said boot being in place on a hand tool of the ratchet-type cable cutter construction;

FIG. 2 is a top view of the protective boot of FIG. 1 as applied to said hand tool;

FIG. 3 is an end view of the protective boot of FIG. 1;

FIG. 4 is a sectional view taken along the line 4—4 of FIG. 3;

FIG. 5 is a top view of the boot of FIG. 1;

FIG. 6 is a front elevational view of cover for the boot of FIG. 1;

FIG. 7 is a bottom view of the cover of FIG. 6;

FIG. 9 is a left end view of the protective boot of FIG. 8;

FIG. 10 is a bottom view of the protective boot of FIG. 8;

FIG. 11 is the right end view of the boot of FIG. 8;

FIG. 12 is a sectional view taken along the line 12—12 of FIG. 11.

DESCRIPTION OF THE PREFERRED EMBODIMENTS

Figure 8:
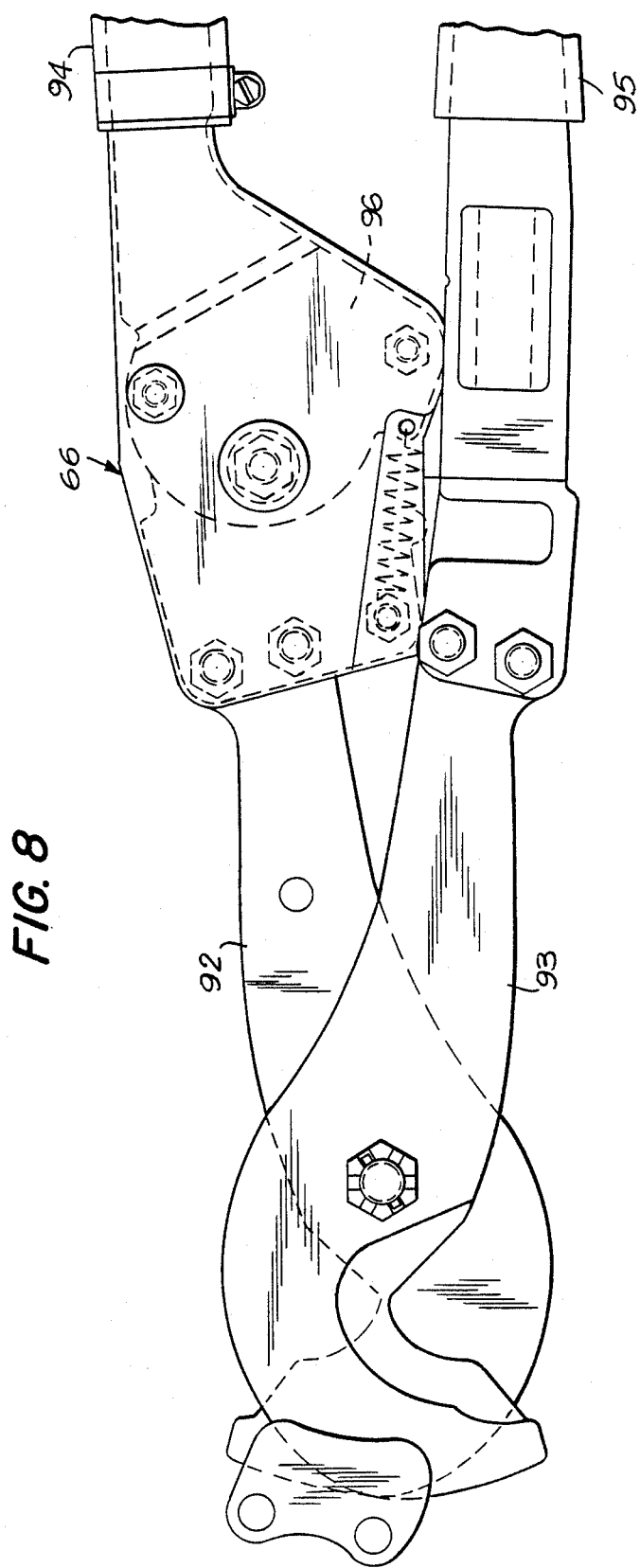
FIG. 8 is a front elevation of an alternative embodiment of a protective boot in accordance with the invention, said boot being in place on a hand tool of the ratchet-type cable cutter construction.

With reference to the FIGS. 1–7, the protective boot of this invention is an enclosure 10 including two opposed side walls 12, 14, a top 16 and bottom 18. As best illustrated in FIGS. 3, 4, 5, the walls 12, 14, top 16 and bottom 18 are relatively thin thereby defining an enclosed space 20 therebetween. The top 16 and bottom 18 terminate at the front or left end 22 (FIG. 4) leaving the front end 22 of the boot 10 open. The top 16 and bottom 18 extend toward the right or back end 24 and terminate at positions which allow freedom of motion for tool handles 26, 28 as discussed more fully hereinafter.

An opening 34 extends between the rear end 30 of the top 16 to the rear end 32 of the bottom 18. Flaps 36, 38 are connected respectively to the side walls 12, 14 at one edge and extend toward each other to meet at the center line 40 of the opening 34 with only a small gap, if any, between them. The flaps 36, 38 are approximately of the same thickness as the enclosure walls, top and bottom.

The enclosure 10 is formed, for example, by molding, of flexible material, preferably as one piece which is slit at the center line 40 in the back end 24. The flaps 36, 38 being flexible can be spread apart such that the full opening 34 at the back end 24 is exposed. Hollow protrusions 44, 46 extend from the side walls 12, 14 to accommodate portions of the tool to which the enclosure 10 is applied. Side openings 48 in the walls 12, 14 accommodate protruding knobs 64 on the tool, to which the enclosure 10 is applied, which must be accessible to the user of the tool for adjustment and setting.

A cover 50 comprises a base 52 having a plurality of posts 54 attached thereto or formed integrally therewith. The posts 54 are terminated at their free ends with hemispherical tops 56 of slightly larger diameter than the posts 54. The cover 50 is formed of flexible material with the posts 54 spaced apart and arranged in correspondence with the holes 42 on the flaps 36, 38. The post 54, hemispherical tops 56, and holes 42 comprise means for positioning the cover means 50 on the flaps 36, 38. The diameter of the holes 42 relative to the diameter of the posts 54 and heads 56 allows the heads 56 and posts 54 to be pressed resiliently through the holes 42. The enlarged heads 56 re-expand on the outside surface of the flaps 36, 38 after insertion to provide an anchor for the cover 50 on the enclosure 10. Due to the flexible, resilient properties of the enclosure 10 and cover 50, the cover may be removed and replaced many times without damage to the parts. These enclosure and cover parts are formed of a suitable resilient material, for examples, plastic or rubber.

It will be appreciated that in alternative embodiments in accordance with the invention, many variations are possible. For example, the protrusions 44, 46, which are positioned in the Figures for a particular tool need not be customized. Rather, a generalized expanded enclosed space 20 may be provided allowing more clearance between the enclosure 10 and the tool itself in particular areas so long as means for fixedly positioning the enclosure 10 on the tool are provided as discussed hereinafter. The quality of protrusions 44, 46 and openings 48 in customized constructions will depend upon the requirements of the tool.

The cover 50 may be attached to the enclosure 10 either from outside the flaps 36, 38 or from the inside.

In an alternative embodiment in accordance with the invention, the enclosure 10 is made of rigid material which may be plastic or metal, and the flaps 36, 38 may be hinged or bendable along their attachment lines with the side walls 12, 14, respectively. Thus the opening 34 may be fully exposed for application of the enclosure 10 to the tool after which the flaps are moved into their closed position.

In another alternative embodiment in accordance with the invention, the flaps 36, 38 may be omitted and a cover without holes may be connected at the opened rear of the enclosure 10 after the tool is inserted. The cover is then attached to the side walls 12, 14, in any suitable manner, for example, using posts and holes as illustrated in FIGS. 6 and 7, or an adhesive.

For the sake of an example, the enclosure 10 and cover 50 are illustrated in FIGS. 1 and 2 as applied to a ratchet-type cable cutter, Catalog No. 756, as sold by the Greenlee Tool Company, Rockford, Illinois. The tool includes a pair of movable operative members 58, that is, cutting jaws, and a pair of handles 26, 28. The jaws 58 and the handles 26, 28 are connected to opposite ends of an intermediate mechanism 62 which is partially concealed by the enclosure 10. The handles 26, 28 enter the enclosure 10 through the gaps 34 which exist between the top 16, bottom 18 and flaps 36, 38. A portion of the intermediate mechanism 62 extends from the front end 22 of the enclosure 10 as do the jaws 58.

The tool per se is not a novel portion of the invention. Needless to say, the intermediate mechanism 62 provides some convenience to the user or some mechanical advantage in converting forces applied to the handles 26, 28 to squeeze them together to close the jaws 58 in order to cut through a cable.

In one method, the enclosure 10 is applied to the tool by squeezing the handles 26, 28 together to close the jaws 58. Then, the front end of the tool is pushed through the opening 34 at the back of the enclosure 10, deflecting the flaps 36, 38, until the jaws 58 pass through the opening at the front end 22 and the boot 10 seats at the position shown in FIGS. 1 and 2. By flexing the flaps 36, 38 outwardly, the cover 50 may be applied to the inside surfaces of the flaps, or alternatively, the cover 50 may be applied from outside of the enclosure 10 by pressing the posts 54 through the holes 42. The enclosure 10 and cover 50 are dimensioned such that movement of the handles 26, 28 is not impeded. Similarly, motion of the jaws 58 is not impeded. In the exemplary illustrated tool, a knob 64 extends through the openings 48 in the enclosure 10 to allow the user to operate a release mechanism associated with the tool.

It should be apparent, that depending on the nature of the handles, it is possible when applying the enclosure 10 to the tool to insert the handles through the front end opening 22 of the enclosure 10 and out through the openings at the back end 24. In such case, in a boot customized for a particular tool, the flaps 36, 38 can be permanently joined together in forming the enclosure 10 and the need for the cover 50 may be eliminated.

FIG. 1 and 2 illustrate the type of tool where both handles 26, 28 are associated with the intermediate mechanism 62 as are both jaws 58. Thus, the enclosure 10 is constructed to accommodate the two handles and the jaws. FIGS. 8–12, illustrate an alternative embodiment of an enclosure in accordance with the invention which is constructed for application to a tool having an intermediate mechanism associated with only one of the handles.

Therein a protective boot in accordance with the invention is an enclosure 66 including two opposed side walls 68, 70, a top 72 and bottom 74. As best illustrated in FIGS. 10–12, the walls 68, 70 and top 72 and bottom 74 are relatively thin thereby defining an enclosed space therebetween. The front or left end 78 (FIG. 12) of the boot 66 is substantially closed except for an irregularly shaped opening 80 which extends from the edge at the top 72, down the front end 78 and partially along the bottom 74, terminating in an enlarged portion 82.

The top 72 and the bottom 74 approach each other at the right or rear end 84 of the enclosure 66 leaving a rear opening 86.

The enclosure 66 is formed, for example, by molding a flexible material, preferably as one piece. Hollow protrusions 88, 89, 90 extend from the side walls 68, 70 to accommodate portions of the tool to which the enclosure 66 is applied.

For the sake of an example, the enclosure 66 is illustrated in FIG. 8 and the shape of the opening 80 has been described above as applied to a ratchet-type cable cutter, Catalog No. 757, sold by the Greenlee Tool Company, Rockford, Illinois. The tool includes a pair of movable, operative members 92, 93, that is, cutting jaws, and a pair of handles 94, 95. The operative member 92 and handle 94 are connected to opposite ends of an intermediate mechanism 96 which is partially concealed by the enclosure 66. The operative member 93 is connected to the handle 95 without an intervening intermediate mechanism.

To assemble the boot 66 to the tool, the handle 94 is passed through the boot front opening 80 and out through the rear opening 86 until the flexible enclosure 66 is properly positioned. The tool per se is not a novel portion of the invention. Needless to say, the intermediate mechanism provides some convenience to the user or some mechanical advantage in converting forces applied to the handles 94, 95 to close the jaws 92, 93 in order to cut through a cable.

As with the embodiment of FIGS. 1–7, alternative embodiments of the boot of FIGS. 8–12 may be provided in accordance with the invention. For example, the protrusions 88–90 need not be customized to a particular tool. The enclosure 66 although preferably of form-fitting resilient material may be somewhat oversized to accommodate a family of similar tools with different protrusion patterns. The enclosure in an alternative embodiment may be rigid and in several parts which are fastened together when the enclosure is assembled on the tool. Additionally, the enclosure 66 when resilient, may have a parting line, for example along the top 72, to facilitate assembly to the tool. The parting line may be held in a closed position by a cover and posts as with the embodiment of FIGS. 1–7.

In the boot embodiments in accordance with the invention described above, the intended tool includes a pair of handles and a pair of operative members. It should be understood that an enclosure can be provided in another alternative embodiment in accordance with the invention for a tool having a single handle and a single operative member with an intermediate mechanism therebetween. For example, a ratchet-type screwdriver can have the intermediate ratchet element between the handle and the driver blade covered with a protective boot which does not impede rotation of the driver blade when force is applied to the handle.

With all embodiments an adhesive may be applied to act between the tool and boot to reduce possible relative motion between them.

It will thus be seen that the objects set forth above, among those made apparent from the preceding description, are efficiently attained and, since certain changes may be made in the above constructions without departing frm the spirit and scope of the invention, it is intended that all matter contained in the above description or shown in the accompanying drawings shall be interpreted as illustrative and not in a limiting sense. It is also to be understood that the following claims are intended to cover all of the generic and specific features of the invention herein described, and all statements of the scope of the invention which, as a matter of language, might be said to fall therebetween.

What is claimed is:

1. A protective boot for a tool having a pair of elongated members connected to an intermediate mechanism at spaced-apart locations, and a pair of operative members connected to said intermediate mechanism, said intermediate mechanism being adapted to transmit to said operative members forces applied to said elongate members, said boot comprising:
    an enclosure having a first opening at one end, said first opening being sized to allow at least partial passage therethrough of said operative members;
    a second opening in said enclosure, said second opening being sized to allow at least partial passage therethrough of said operative member, said enclosure, when applied to said tool at least partially enclosing said intermediate mechanism, to protect said mechanism from the environment, with said operative members at least partially extended from said first opening; and
    means to at least partially close said second opening between said spaced apart locations, said means for closing leaving open portions of said second opening, said elongate members extending through said open portions when said enclosure at least partially encloses said intermediate mechanism.

2. A protective boot for a tool having a pair of elongated members at spaced-apart positions connected to an intermediate mechanism at spaced apart locations, and a pair of operative members connected to said intermediate mechanism, said intermediate mechanism being adapted to transmit to said operative members forces applied to said elongate members, said boot comprising:
    an enclosure having a first opening at one end, said first opening being sized to allow at least partial passage therethrough of said operative members;
    a second opening in said enclosure, said second enclosure being sized to allow at least partial passage therethrough of said operative members, said enclosure when applied to said tool at least partially enclosing said intermediate mechanism with said operative members at least partially extended from said first opening;
    means to at least partially close said second opening between said spaced-apart positions, said means for closing leaving open portions of said second opening, said elongate members extending through said open portions when said enclosure at least partially encloses said intermediate mechanism;
    said enclosure includes a plurality of surfaces, at least two said surfaces being separated to form said second opening, and wherein said means for closing said second opening include at least one flap hingedly connected along said second opening to edges of said surfaces, said at least one flap extending toward an opposing edge and spanning the distance between elongate members when said elongate members extend from said open portions of said second opening.

3. A protective boot as claimed in claim 2, wherein said at least one flap is formed of resilient material.

4. A protective boot as claimed in claim 3, wherein said enclosure is formed of resilient material, said at least as one flap being integral with said enclosure.

5. A protective boot as claimed in claim 2, and further comprising cover means including means for positioning said cover means on said at least one flap in an overlying position for maintaining said at least one flap in said distance-spanning orientation.

6. A protective boot as claimed in claim 5, wherein said at least one flap includes holes passing therethrough, and said means for positioning includes posts having enlarged heads, said cover means being attachable to said at least one flap by passing said posts, through said holes, said enlarged heads passing through said at least one flap and impeding withdrawal of said posts from said holes.

7. A protective boot as claimed in claim 2, wherein said enclosure is shaped to conform with surfaces of said tool when said boot is positioned on said tool.

8. A protective boot as claimed in claim 6, wherein said enclosure is shaped to conform with the surfaces of said tool when said boot is positioned on said tool.

9. A protective boot as claimed in claim 2, and further comprising additional openings in said enclosure, said additional openings corresponding with portions of said intermediate mechanism requiring access during operation of said tool.

10. A protective boot as claimed in claim 2, wherein said pair of elongate members are handles and said intermediate mechanism transmits handle forces with a mechanical advantage to said operative members.

11. A protective boot for a tool having a plurality of elongate members, an intermediate mechanism, at least one of said elongate members being connected to said intermediate mechanism, a plurality of operative members, at least one of said operative members being connected to said intermediate mechanism, said intermediate mechanism transmitting forces applied to said at least one connected elongate member to said at least one connected operative member, comprising:

an enclosure including sidewalls, a top wall, a bottom wall and a pair of spaced apart end walls defining a front wall and a rear wall, said enclosure at least partially enclosing said intermediate mechanism when applied to said tool, said front wall having an irregular shaped opening formed therein and extending along a major portion of said wall through which an operative member may extend for movement by said intermediate mechanism, the rear wall of said enclosure including a solid wall portion extending along a major portion of its length, and an opening therein through which said one elongate member may extend, said boot when applied to said tool protecting the enclosed portion of said intermediate mechanism.

12. A protective boot as claimed in claim 11 further comprising hollow protrusions in the sidewall member to accommodate protuberant portions of said intermediate mechanism.

13. A protective boot in combination with a tool having a pair of elongated members connected to an intermediate mechanism at spaced-apart locations, and a pair of operative members connected to said intermediate mechanism, said intermediate mechanism being adapted to transmit to said operative members forces applied to said elongate members, said boot comprising:

an enclosure having a first opening at one end, said first opening being sized to allow at least partial passage therethrough of said operative members;
a second opening in said enclosure, said second opening being sized to allow at least partial passage therethrough of said operative member, said enclosure, when applied to said tool at least partially enclosing said intermediate mechanism, to protect said mechanism from the environment, with said operative members at least partially extended from said first opening; and
means to at least partially close said second opening between said spaced apart locations, said means for closing leaving open portions of said second opening, said elongate members extending through said open portions when said enclosure at least partially encloses said intermediate mechanism.

14. A combination as claimed in claim 13, wherein said tool is for cutting, said elongate members are handles, and said operative members are cutting jaws, said intermediate mechanism providing a mechanical advantage in transmitting forces from said handles to said jaws.

15. A combination as claimed in claim 13, and further comprising means for retaining said boot in position on said tool.

16. A combination as claimed in claim 15, wherein said means to retain is an adhesive material acting between at least one inner surface of said enclosure and an outer surface of said tool.

17. A protective boot in combination with a tool having a pair of elongated members at spaced-apart positions connected to an intermediate mechanism at spaced apart locations, and a pair of operative members connected to said intermediate mechanism, said intermediate mechanism being adapted to transmit to said operative members forces applied to said elongate members, said boot comprising:

an enclosure having a first opening at one end, said first opening being sized to allow at least partial passage therethrough of said operative members;
a second opening in said enclosure, said second enclosure being sized to allow at least partial passage therethrough of said operative members, said enclosure when applied to said tool at least partially enclosing said intermediate mechanism with said operative members at least partially extended from said first opening;
means to at least partially close said second opening between said spaced-apart positions, said means for closing leaving open portions of said second opening, said elongate members extending through said open portions when said enclosure at least partially encloses said intermediate mechanism;
said enclosure includes a plurality of surfaces, at least two said surfaces being separated to form said second opening, and wherein said means for closing said second opening include at least one flap hingedly connected along said second opening to edges of said surfaces, said at least one flap extending toward an opposing edge and spanning the distance between elongate members when said elongate members extend from said open portions of said second opening.

18. A protective boot as claimed in claim 16 and further comprising cover means including means for positioning said cover means on said at least one flap in an overlying position for maintaining said at least one flap in said distance-spanning orientation.

19. A protective boot in combination with a tool having a plurality of elongate members, an intermediate mechanism, at least one of said elongate members being connected to said intermediate mechanism, a plurality of operative members, at least one of said operative members being connected to said intermediate mechanism, said intermediate mechanism transmitting forces applied to said at least one connected elongate member to said at least one connected operative member, comprising:

an enclosure including sidewalls, a top wall, a bottom wall and a pair of spaced apart end walls defining a front wall and a rear wall, said enclosure at least partially enclosing said intermediate mechanism when applied to said tool, said front wall having an irregular shaped opening formed therein and extending along a major portion of said wall through which an operative member may extend for movement by said intermediate mechanism, the rear wall of said enclosure including a solid wall portion extending along a major portion of its length, and an opening therein through which said at least one connected elongate member may extend.

20. A protective boot for a tool having a plurality of elongate members, an intermediate mechanism, at least one of said elongate members being connected to said intermediate mechanism, a plurality of operative members, at least one of said operative members being connected to said intermediate mechanism, said intermediate mechanism transmitting forces applied to said at least one connected elongate member to said at least one connected operative member, comprising:

an enclosure including at least two sidewalls, said sidewalls joined at the top and bottom portions and a pair of spaced end walls defining a front wall and a rear wall, said enclosure at least partially including said intermediate mechanism when applied to a tool, said front wall having an asymmetrically shaped opening formed therein, and extending along at least a portion of said wall through which an operative member may extend for movement by said intermediate mechanism, the rear wall of said enclosure including at least a solid wall portion extending along at least a portion of its length, and an opening therein through which said at least one connected elongate member may extend.

21. A protective boot as claimed in claim 20 further comprising hollow protrusions in the sidewall members to accommodate protuberant portions of said intermediate mechanism.

22. A protective boot in combination with a tool having a plurality of elongate members, an intermediate mechanism, at least one of said elongate members being connected to said intermediate mechanism, a plurality of operative members, at least one of said operative members being connected to said intermediate mechanism, said intermediate mechanism transmitting forces applied to said at least one connected elongate member to said at least one connected operative member, comprising:

an enclosure including at least two sidewalls, said sidewalls joined at the top and bottom portions and a pair of spaced end walls defining a front wall and a rear wall, said enclosure at least partially including said intermediate mechanism when applied to a tool, said front wall having an asymmetric shaped opening formed therein, and extending along at least a portion of said wall through which an operative member may extend for movement by said intermediate mechanism, the rear wall of said enclosure including at least a solid wall portion extending along at least a portion of its length, and an opening therein through which said one elongate member may extend.

* * * * *

UNITED STATES PATENT AND TRADEMARK OFFICE
CERTIFICATE OF CORRECTION

PATENT NO. : 4,829,672

DATED : May 16, 1989

INVENTOR(S) : William Riebock

It is certified that error appears in the above-identified patent and that said Letters Patent is hereby corrected as shown below:

Column 8 line 27 change "claim 16" to --claim 17--

Signed and Sealed this

Fourth Day of September, 1990

Attest:

HARRY F. MANBECK, JR.

*Attesting Officer*     *Commissioner of Patents and Trademarks*